(12) United States Patent
Kulkarni et al.

(10) Patent No.: US 12,705,556 B2
(45) Date of Patent: Aug. 11, 2026

(54) MAP-BASED TASK SCHEDULING

(71) Applicant: Oracle International Corporation, Redwood Shores, CA (US)

(72) Inventors: Vishal Ashok Kulkarni, Hyderabad (IN); Rahul Singh, Hyderabad (IN); Aditya Kumar Singh, Hyderabad (IN); Jaideep C. Bhatia, Castro Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/920,135

(22) Filed: Oct. 18, 2024

(65) Prior Publication Data

US 2026/0111812 A1 Apr. 23, 2026

(51) Int. Cl.

| | |
|---|---|
| ***G06Q 10/0631*** | (2023.01) |
| ***G06F 16/29*** | (2019.01) |
| *G06F 3/0482* | (2013.01) |

(52) U.S. Cl.
CPC ..... *G06Q 10/063116* (2013.01); *G06F 16/29* (2019.01); *G06F 3/0482* (2013.01)

(58) Field of Classification Search
CPC ............. G06Q 10/06; G06Q 10/06316; G06Q 10/063114
See application file for complete search history.

(56) References Cited

U.S. PATENT DOCUMENTS

| | | | | |
|---|---|---|---|---|
| 11,164,121 | B1 * | 11/2021 | Snider | G06Q 10/063114 |
| 2004/0205298 | A1 * | 10/2004 | Bearden | G06F 12/0862 711/113 |
| 2014/0359510 | A1 * | 12/2014 | Graf | G01C 21/3667 715/771 |
| 2016/0321577 | A1 * | 11/2016 | Hurst | G06Q 10/0631 |
| 2018/0075415 | A1 * | 3/2018 | Ray | G06F 16/29 |
| 2020/0034765 | A1 * | 1/2020 | Gupta | G06F 16/29 |

* cited by examiner

*Primary Examiner* — Johnna R Loftis
(74) *Attorney, Agent, or Firm* — Invoke

(57) ABSTRACT

Techniques for managing tasks and resources using a map-based GUI are disclosed. A system determines locations and available actions associated with the tasks. The system generates a map representing a geographic region and markers indicating the locations of the tasks within the region. In response to the selection of a marker corresponding to a particular task, the system presents an interactive tooltip corresponding to the available action. Responsive to the selection of the graphic element, the system calls an API that performs the action while concurrently presenting the map.

20 Claims, 9 Drawing Sheets

DISPLAY 412
INPUT DEVICE 414
CURSOR CONTROL 416
MAIN MEMORY 406
ROM 408
STORAGE DEVICE 410
BUS 402
PROCESSOR 404
COMMUNICATION INTERFACE 418
400
NETWORK LINK 420
428
INTERNET
ISP
426
SERVER 430
LOCAL NETWORK 422
HOST 424

MAP-BASED TASK SCHEDULING

TECHNICAL FIELD

The present disclosure relates to computer-implemented scheduling systems. In particular, the present disclosure relates to improving performance of computer-implemented scheduling systems.

BACKGROUND

Customer Service Software (CSS) manages interactions with customers. For example, a customer may interact with a CSS to submit a service request to a business or other entity. The CSS may handle the customer's request using a process called "ticket management." When the customer contacts the business with the request, the CSS generates a "ticket" that records details associated with the request, including the customer's contact information, the nature of the inquiry, and a priority level. Based on the details, the CSS routes the ticket to an appropriate customer service representative and tracks the ticket through resolution of the request.

Responding to some tickets includes providing field services to customers. A "field service" involves dispatching a worker to perform tasks at a location off-site from a service provider's base of operations. Examples of off-site locations include customer facilities, residences, utilities, and public spaces. Example tasks include installing, repairing, cleaning, and/or maintaining buildings, land, infrastructure, equipment, appliances, machinery, and/or systems.

Service providers may use Field Service Management (FSM) systems to provision and manage field services. For example, an FSM system may allocate a service technician to perform a series of off-site maintenance and repair services. Subsequently, the FSM system tracks the technician's progress while performing the services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
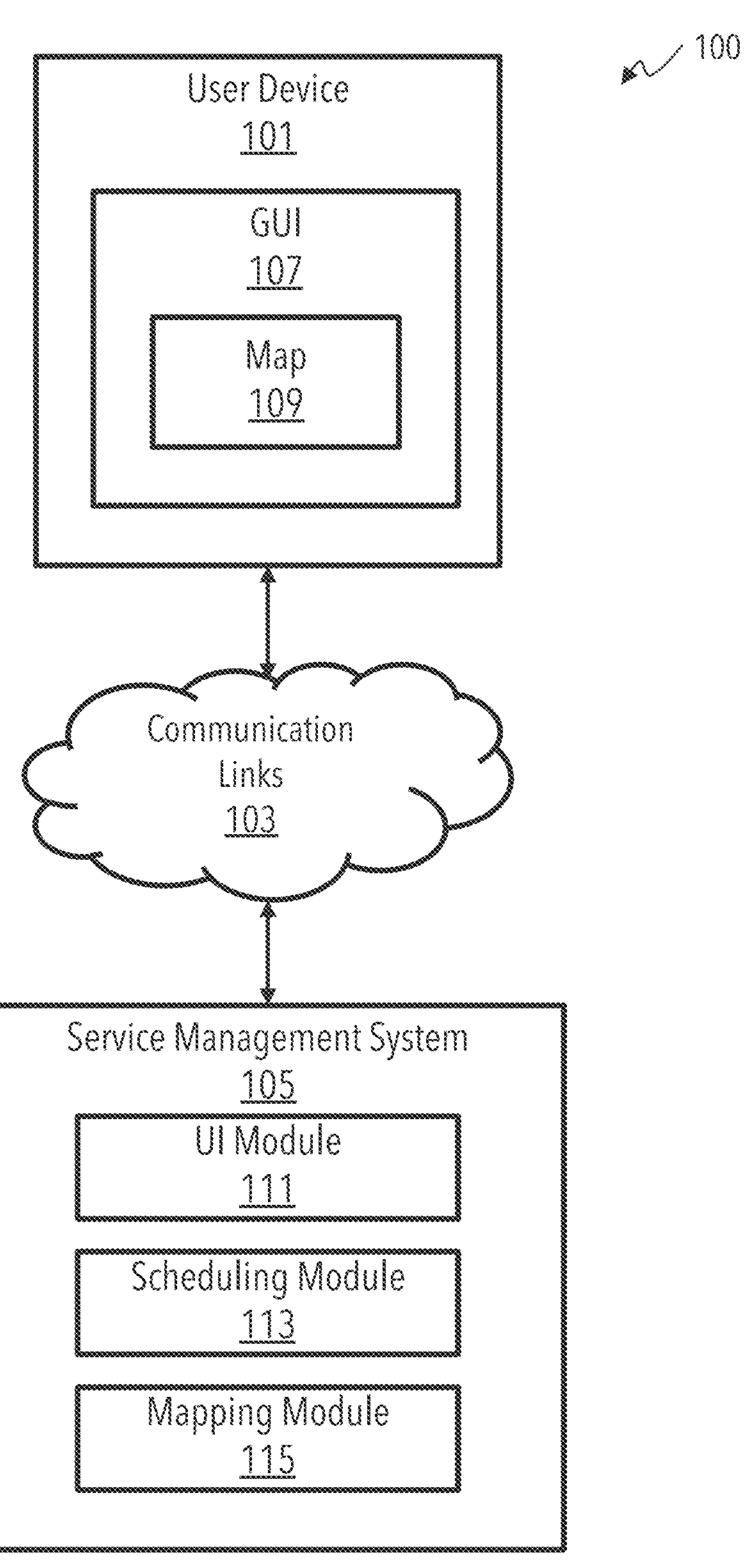
FIG. 1A illustrates a functional block diagram of an example service management architecture in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. PRACTICAL APPLICATIONS, ADVANTAGES & IMPROVEMENTS
3. SERVICE MANAGEMENT ARCHITECTURE
4. SERVICE MANAGEMENT SYSTEM
5. MANAGING FIELD SERVICES WITHIN A MAP-BASED GUI
6. EXAMPLE OF FIELD SERVICE MANAGEMENT USING A MAP VIEW
7. HARDWARE OVERVIEW
8. MISCELLANEOUS; EXTENSIONS

1. General Overview

One or more embodiments manage resources for field service tasks using a map-based GUI. A field service management system maintains metadata detailing the tasks, including location information, scheduling information, and resource information. A resource includes any input or asset assignable to a particular task. Example resources include workers, vehicles, tools, materials energy, time, and money. The metadata may be associated with one or more actions corresponding to the tasks, such as scheduling and unscheduling resources. Using the metadata, the system generates a GUI presenting an interactive map that represents a geographic region. The interactive map includes markings that indicate tasks within the region. A user may select a particular marker on the map to display metadata of the corresponding task and trigger an action available for that task within the map itself.

One or more embodiments include a field service management system that determines geographic locations and available actions associated with tasks based on metadata describing the tasks. The system generates a GUI presenting a map that represents a geographic region and markers indicating the locations of tasks within the region. Via the GUI, the system receives user input selecting a marker corresponding to a particular task associated with a particular location. Responsive to receiving the user input, the system presents a selectable graphic element, such as an interactive tooltip or pop-up menu, corresponding to the available action associated with the particular task in the GUI concurrently with the map. Via the GUI, the system receives another user input selecting the graphic element corresponding to the available action. Responsive to receiving the user's selection of the graphic element, the system calls an application programming interface (API) that performs the action while concurrently presenting the map in the GUI.

One or more embodiments described in this Specification and/or recited in the claims may not be included in this General Overview section.

2. Practical Applications, Advantages & Improvements

One or more embodiments enhance the technical capability of computing systems to handle complex field management scenarios through an improved user interface. The user interface allows computing systems to manage and schedule resources by using a limited set of information. Additionally, the user interface selectively displays a subset of the information in a map-based GUI. By doing so, embodiments reduce the complexity of the FSMs and improve their overall efficiency.

In a non-limiting example, a dispatcher uses an FSM to assign tasks to field service technicians based on the technicians' respective schedules, availabilities, locations, assigned tasks, destinations, etc. Without the map-based approaches described herein, a dispatcher might evaluate these parameters by accessing multiple dashboards including, for example, a Gantt chart, a table board, and/or a plan board, that display task timelines and resources. A Gantt chart visually represents the timeline of a project by plotting tasks on a horizontal timeline, where individual tasks are displayed as a bar that spans the time period during which the task is scheduled to occur. A table board lists tasks, resources, deadlines, and other details in a tabular format. A plan board visually organizes tasks or technicians' availability in a display that allows dispatchers to adjust assignments. In this alternative approach, the dispatcher switches back and forth between two or more such dashboards to evaluate and compare different scenarios before scheduling a particular task. With each switch, the FSM consumes computing resources to update the dashboards with current task metadata, task status, technician schedule, technician availability, and/or technician location. Additionally, with each switch, the system consumes computing resources regenerating and re-rendering the various dashboards with the updated information.

In contrast to the alternative approach described above, one or more embodiments avoid consuming computing resources involved in repeatedly generating and updating various dashboards involved in scheduling tasks using FSM systems or other service management platforms. Rather, one or more embodiments use a reduced set of task information to generate an improved GUI that manages tasks entirely within a single map view. Thus, one or more embodiments improve the performance of computer-implemented scheduling systems by avoiding the update and display of various different scheduling dashboards with current information. Furthermore, by combining locations, scheduling information, and actions associated with tasks into the unified map display, embodiments improve the technological performance of the FSM systems by generating an improved graphic user interface that uses and displays a reduced information set.

3. Service Management Architecture

FIG. 1 illustrates an example service system architecture 100 in accordance with one or more embodiments. Embodiments of the architecture 100 manage the scheduling of tasks and resources for entities that deliver field services to customers. For example, the architecture 100 may be used to identify and schedule a technician to repair an appliance at a residential home of a customer. As illustrated in FIG. 1, the architecture 100 includes a user device 101 and a service management system 105 that are communicatively connected, directly or indirectly, via one or more communication links 103. In one or more embodiments, the architecture 100 includes more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The user device 101 includes one or more computing devices communicatively linked with the service management system 105 for evaluating, scheduling, managing, and/or monitoring resources and tasks used to fulfill service requests. A user of the user device 101 can be any individual, such as a field manager or dispatcher for a service entity. The user device 101 may be a personal computer, workstation, server, mobile device, mobile phone, tablet device, and/or other processing device capable of implementing and/or executing software, applications, etc.

One or more embodiments of the user device 101 present a GUI 107 allowing a user to access, perceive, and interact with the service management system 105. For example, the user device 101 may execute software, such as a Web browser or client application, that generates the GUI 107 using a computer-user interface that the user interacts with to view and manage tasks performed by field service technicians. As detailed herein, embodiments of the GUI 107 present a limited set of information that allows users to efficiently manage tasks solely using a map 109.

The map 109 is an interactive GUI that presents a geographic view of field service tasks indicating the locations of tasks within a geographic region. A geographic region refers to a specific area or zone on the Earth's surface defined by natural or artificial boundaries. In the context of the map 109, the geographic region represents the area where field service tasks are distributed and managed. The map 109 provides a visual representation of the geographic region, allowing visualization of the task locations within the geographic region. The geographic region may include a city, state, or any other defined area where service activities take place. For example, using the map 109, a user may view task locations of currently available tasks and currently scheduled tasks. The locations are represented on the map 109 by markers or other visual indicators. The map 109 may differentiate the status of the tasks, such as open, scheduled, unscheduled, canceled, or closed, using color-coded markers. Additionally, the map 109 may include navigation tools that allow the user to select and zoom in on portions of the geographic region. Furthermore, the map 109 may include navigation tools that allow the user to filter tasks displayed in the GUI based on various criteria, such a task status or task urgency. Moreover, the user may view detailed information of the individual tasks by clicking on a task marker corresponding to the task.

The communication links 103 include wired and/or wireless information communication channels, such as the Internet, an intranet, an Ethernet network, a wireline network, a wireless network, a mobile communications network, and/or another communication network. For example, the user device 101 may communicate with the service management system 105 via the Internet by exchanging data packets through a Wi-Fi or cellular data network connection.

The service management system 105 includes one or more computing devices for viewing, scheduling, managing, and monitoring tasks. As described in greater detail below, the service management system 105 may include a user interface (UI) module 111, a scheduling module 113, and a mapping module 115. The UI module 111 generates the GUI 107 and map 109 for interaction with a user at, for example, the user device 101. Generating the GUI 107 includes processing and translating data into visual elements, such as icons, buttons, forms, dashboards, and map tiles, for rendering by the GUI 107. Additionally, the UI module 111 updates the data and the visual elements presented by the GUI 107 in response to user inputs, such as clicks, taps, or keyboard entries captured by the GUI 107.

The scheduling module 113 creates, manages, and monitors field services, including tasks and resources for performing the tasks. Some embodiments of the scheduling module 113 include a scheduling model that uses predictive analytics and machine learning to schedule resources to tasks based on metadata, such as resource availability, skill sets, task priority, and geographic location. By applying the scheduling model to the specific requirements of individual tasks, the scheduling module 113 optimizes resource and task allocation.

The mapping module 115 maintains and determines information for generating the map 109 by the UI module 111. The mapping module 115 processes map information from databases of geographical information that may include details about roads, buildings, landmarks, and natural features. When a user requests the map 109, the mapping module 115 determines the geographic region included in the map 109 based on the user's search query. Additionally, the mapping module 115 registers tasks locations in the geographic region with coordinates of the map 109. Furthermore, the mapping module 115 may retrieve dynamic data, such as traffic and weather conditions, for determining travel time, distance, and routes for task locations.

3. Service Management System

Figure 1B:
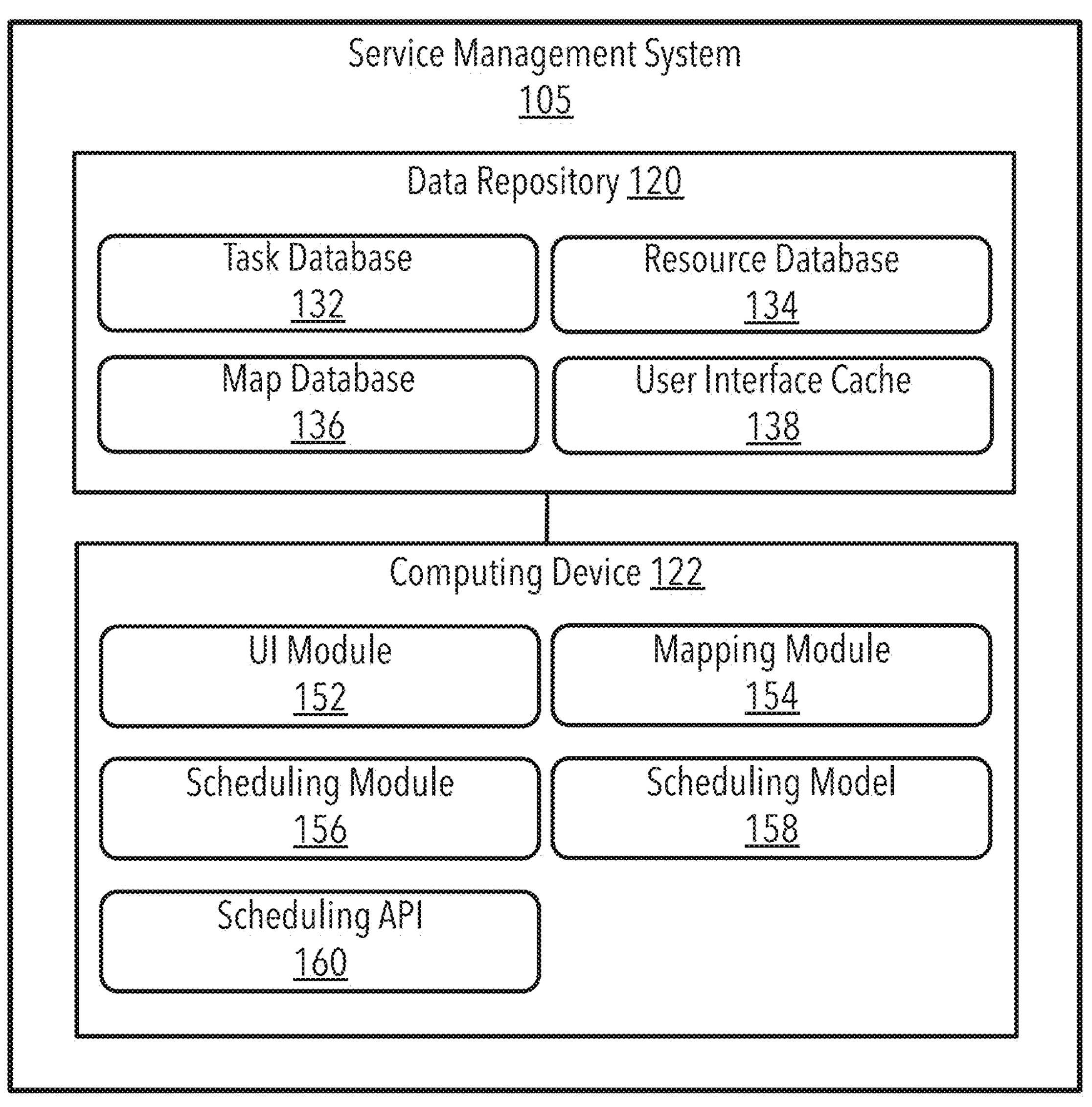
FIG. 1B illustrates a system block diagram of an example service management system in accordance with one or more embodiments.

FIG. 1B is a block diagram illustrating an example service management system 105 in accordance with one or more embodiments. The service management system 105 includes hardware and software that perform processes and functions described herein. In one or more embodiments, the service management system 105 includes more or fewer components than the components illustrated in FIG. 1B. The components illustrated in FIG. 1B can be local to or remote from each other. The components illustrated in FIG. 1B can be implemented in software and/or hardware. Components can be distributed over multiple applications and/or machines. Multiple components can be combined into one application and/or machine. Operations described with respect to one component can instead be performed by another component.

One or more embodiments of the service management system 105 include a data repository 120 and a computing device 122. The data repository 120 includes any type of storage unit and/or device (e.g., a file system, database, collection of tables, or any other storage mechanism) for storing data. Furthermore, the data repository 120 may include multiple different storage units and/or devices. The multiple different storage units and/or devices may or may not be of the same type or located at the same physical site. Furthermore, the data repository 120 can be implemented or executed on the same computing system as the service management system 105. Additionally, or alternatively, the data repository 120 may be implemented or executed on a computing system separate from the service management system 105. The data repository 120 can be communicatively coupled, wired and/or wirelessly, to the service management system 105 via a direct connection or via a network.

In one or more embodiments, the data repository 120 stores a task database 132, a resource database 134, a map database 136, and a user interface cache 138. The task database 132 includes one or more data structures that store records containing information describing tasks generated and managed by the service management system 105. The records stored by the task database 132 may include task metadata, such as a ticket ID, a task description, product information, start date, required resolution date, assigned technician, priority level, scheduled date and time, estimated duration, and the task location. Additionally, records stored by the task database 132 may include information that tracks the statuses of individual tasks. For example, a status of a task can include open, scheduled, in-progress, rescheduled, unscheduled, and canceled. Open tasks include ones awaiting further action or approval before advancing. Scheduled tasks include ones that have been assigned a specific time for execution. In-progress tasks include ones currently being worked on. Rescheduled tasks include ones that were previously scheduled but having an adjustment in their respective timing. Unscheduled task include ones that were previously scheduled but are no longer tied to a specific time and/or resource. Canceled tasks include ones that are longer required or cannot be completed.

The resource database 134 includes one or more data structures that store sets of records containing information profiling resources managed by the service management system 105. The records stored by the resource database 134 may include metadata used for assigning, scheduling, and/or dispatching resources to tasks. In the context of FSM, the resource database 134 may store metadata profiling field service workers, such as technicians, for matching the workers with the tasks. Example resource metadata may include name, contact details, resource ID, type, title, role, expertise, skills, certifications, qualifications, equipment, location, work schedule, and/or availability.

The map database 136 includes one or more data structures that store map data for generating maps. For example, the map database 136 may store a set of tiles that include a portion of a map and registration information for combining the tiles. The map data may also include static information describing roads, terrain, buildings, landmarks, and other geographical features. Additionally, the map database 136 may store dynamic information of, for example, current weather and traffic conditions from real-time feeds. Furthermore, the map database 136 may include routing algorithms that calculate the routes for resources to follow based on weather, traffic conditions, and/or the specific requirements of tasks.

The user interface cache 138 includes one or more data structures that store information to enhance performance and reduce loading times. One or more embodiments of the user interface cache 138 store pre-fetched task metadata, resource metadata, map labels, graphic elements, and other information that allows the service management system 105 to quickly display map elements. For instance, the user interface cache 138 may store pre-fetched task metadata for individual task markers displayed on a map.

In one or more embodiments, the computing device 122 includes hardware and/or software configured to perform operations described herein. Example operations are described below with reference to FIGS. 2A and 2B. The computing device 122 executes computer-readable program instructions, such as an operating system and application programs, that are stored in memory devices and/or the storage system. Additionally, the computing device 122 executes program instructions of a user interface (UI) module 152, a mapping module 154, and a scheduling module 156 that may be the same as those described above. Moreover, the computing device 122 executes program instructions of a scheduling model 158 and a scheduling API 160.

The scheduling model 158 comprises hardware, software, or a combination thereof that optimizes the allocation of resources to tasks for fulfilling service requests. The scheduling model 158 applies artificial intelligence or machine learning that assigns resources to tasks based on multiple parameters, including task metadata and resource metadata. For instance, the parameters of a task may include a product requiring a technician with specific skills and/or completion before a particular date. Additionally, the parameters can include various technicians'schedules, skill sets, current workload, and geographical location. Based on the parameters, the scheduling model 158 schedules an appropriate technician to complete the task before the particular date.

The scheduling API 160 provides an interface between user interface module 152 and the scheduling module 156 to perform actions associated with tasks displayed in a map via a GUI. The scheduling API 160 may act as an intermediary between the user interface module 152 and the scheduling module 156 for storing and retrieving metadata of tasks stored in the task database 132 and resources stored in the resource database 134. Example actions permed by the scheduling API 160 include scheduling, unscheduling, rescheduling, cancelling, and completing tasks.

5. Managing Field Services Within a Map-Based GUI

Figure 2A:
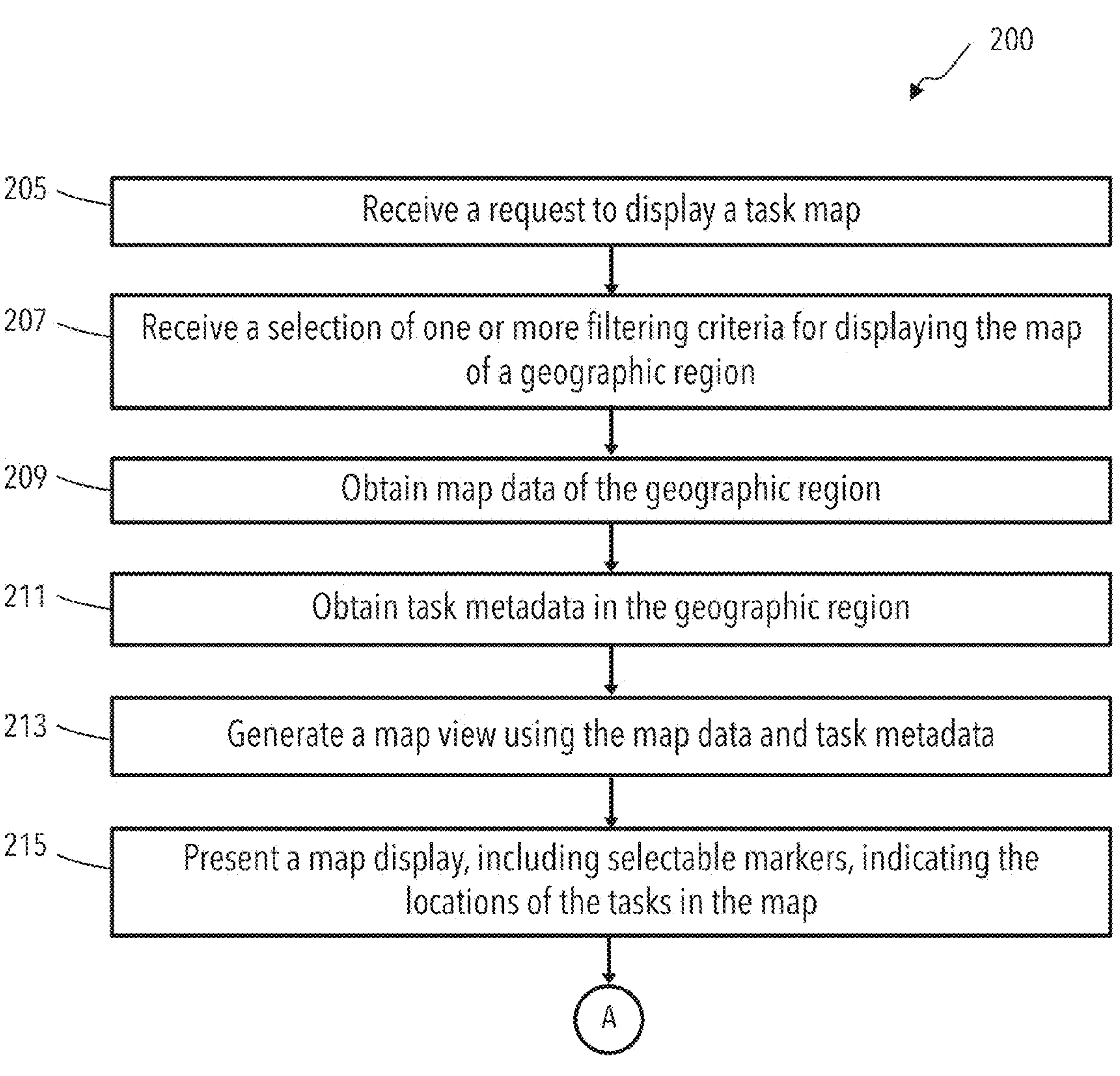
FIGS. 2A and 2B illustrate a set of operations of an example process for managing field services within a map-based graphic user interface (GUI) in accordance with one or more embodiments.
Figure 2B:
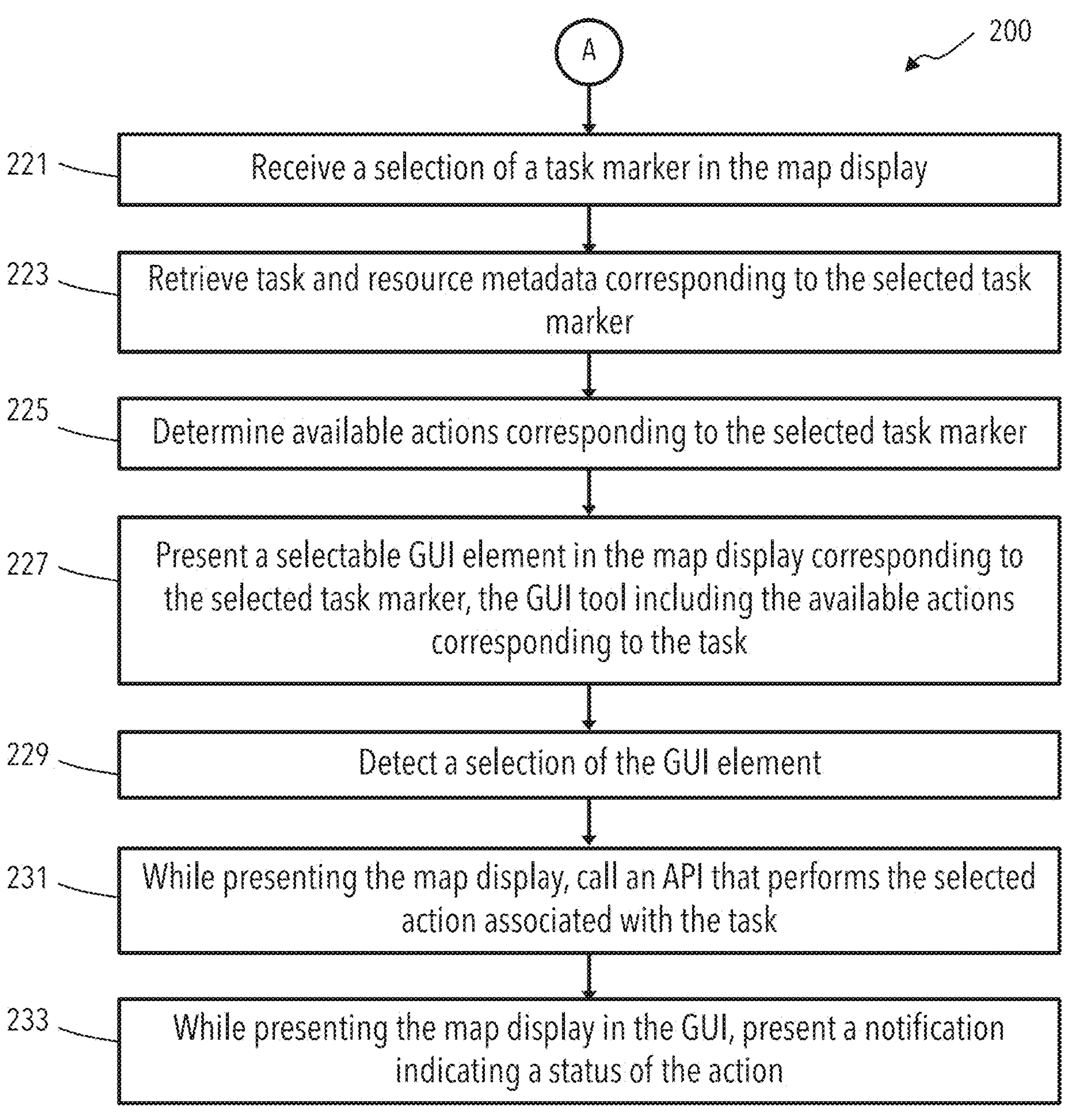

FIGS. 2A and 2B illustrate a set of operations of an example process 200 for managing field services within a map-based GUI in accordance with one or more embodiments. One or more operations of the process 200 illustrated in FIGS. 2A and 2B may be modified, rearranged, or omitted. Accordingly, the particular sequence of operations should not be construed as limiting the scope of one or more embodiments.

Referring to FIG. 2A, a system receives a request to display a task map (Operation 205). A user may input the request by interacting with the system via a GUI generated by a browser application or remote client executed by a user device. The GUI may present selections of various dashboards for managing tasks, such as a Gantt chart, a table board, a plan board, and the task map. For example, the system may be an FSM system and the user may be a dispatcher that accesses one or more of the dashboards to manage repair requests.

The system receives a selection of one or more filtering criteria for displaying the map that includes a geographic region (Operation 207). The user may interact with various types of GUI input elements to choose one or more criteria to specify a geographic region and types of tasks for display in the map. For example, the input elements may include a search bar for receiving text identifying a location or region, a dropdown menu listing geographic regions for selection, and a slider that controls the radius of a region around a central point. Additionally, the input elements may include checkboxes or toggles for selecting different types of tasks, such as open tasks, assigned tasks, scheduled tasks, unscheduled tasks, closed tasks, and canceled tasks. In some cases, the system uses a default geographic region and/or filtering criteria that may be modified by the inputs to the GUI.

The system obtains map data of the geographic region (Operation 209). Using the filtering criteria, the system retrieves the map data corresponding to the geographic region from a map database. For example, the system may call an API that generates a query for the map database to retrieve a combination of map tiles having coordinates spanning the geographic region. In response to the query, the API may return the map tiles along with information describing roads, terrain, buildings, landmarks, and geographical features.

The system obtains task metadata in the geographic region (Operation 211). Using the selected filtering criteria, the system retrieves the task metadata from a task database. The system may query the task database to retrieve the task metadata corresponding to the selected map region and task types. For example, the system may call an API that generates a query of the task database to retrieve metadata of tasks corresponding to locations within the map and with a status indicating that the tasks are available. Once the query is executed, the API may return the relevant metadata for the tasks. The task metadata includes information describing details of the tasks and information describing resource requirements for the tasks. In the context of an example FSM, the details of a task may include a task identifier, a priority level, a status, a client identifier, a customer name, a customer identifier, contact details, service location, issue description, and type of service (e.g., installation, maintenance, repair). The resource requirements may include resource types, resource qualifications, service requirements, timing requirements, service instructions, tools and parts, safety protocols, service time, and estimated duration.

The system generates a map view using the map data and the task metadata (Operation 213). Generating the map view includes integrating the map data with selectable markers at positions within the map representing individual tasks to visually indicate the geographic locations of tasks. The markers may be interactive GUI elements that allow the user to select (e.g., by hovering or clicking) the markers to view detailed task information. In some embodiments, the system stores information associated with the GUI elements, including task metadata, resource requirements, and locations, in a local data storage cache to allow rapid access. Additionally, the system may pre-fetch resource information for the individual tasks from a resource database and store the resource information in the cache with the corresponding task information.

Figure 3A:
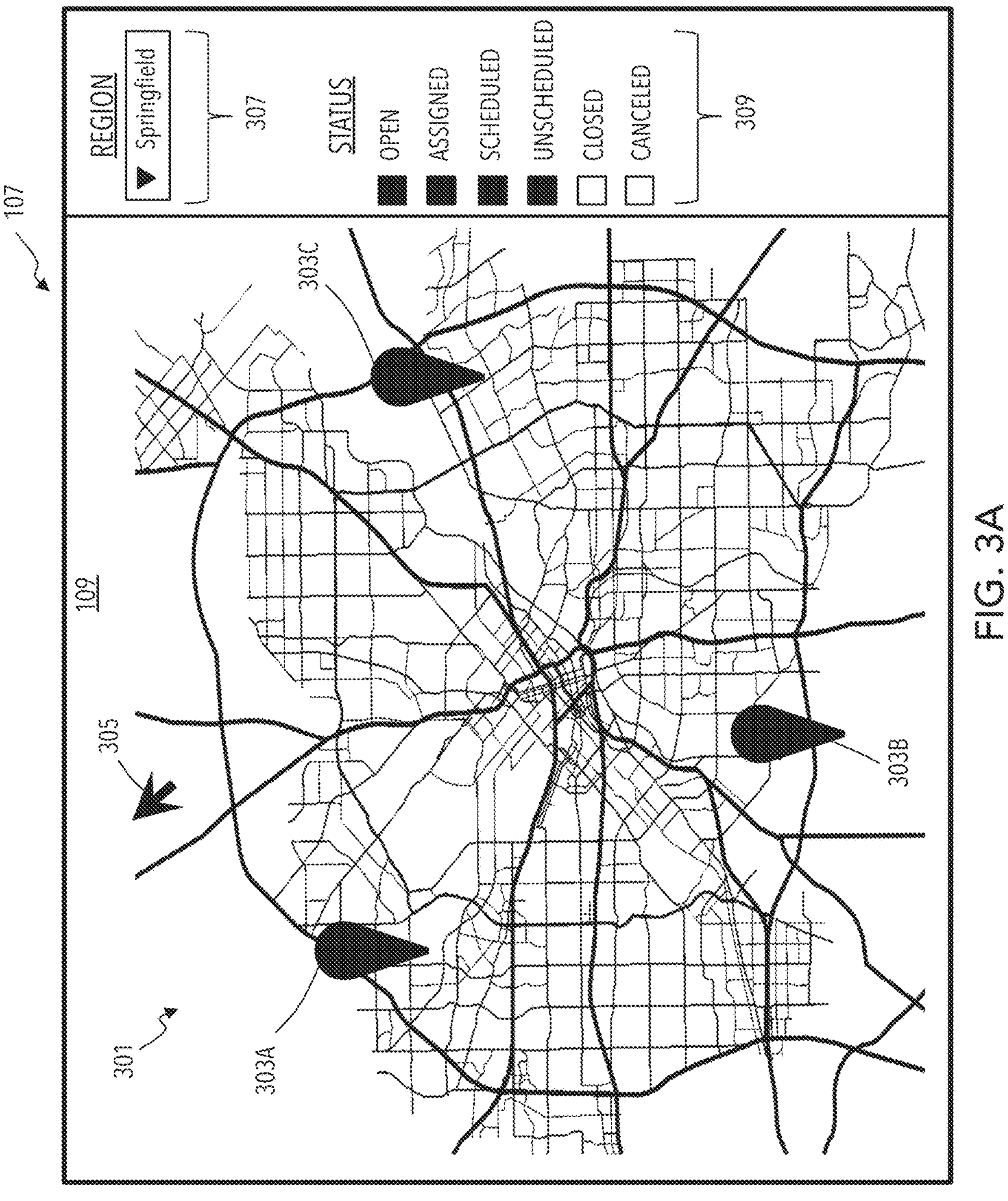
FIGS. 3A, 3B, 3C, and 3D illustrate example map displays generated by a GUI in accordance with one or more embodiments.

The system presents a map display, including the selectable markers, indicating the locations of tasks in the map (Operation 215). Presenting the map display comprises rendering the map view in the GUI display of the user device. For example, the system transmits the map view to a browser application at the user device for presentation on a display screen of the user device. The map display visually represents the task markers placed at specific coordinates corresponding to the locations of various tasks. For example, as illustrated in FIG. 3A, a GUI 107 displays a map 109 of a region 301 that includes task markers 303A, 303B, and 303C that are selectable using a pointer 305. Additionally, the GUI 107 includes a region selection element 307 and filtering criteria selection elements 309 that allows the user to filter the displayed task by the map 109 based on the region and type of tasks.

Referring to FIG. 2B, as indicated by off-page connector "A", the system receives a selection of one of the task markers in the map display from the user via the GUI (Operation 221). For example, referring to FIG. 3A, the user may control the pointer 305 to select the task marker 303A in the map 109. The selection can be a positive action, such as pointing and clicking the task marker 303A with the pointer 305, or a passive action, such as hovering the pointer 305 over the task marker 303A.

In response to the selection of the task marker, the system retrieves task and resource metadata corresponding to the selected task marker (Operation 223). Retrieving the task and resource data includes detecting the selection of the specific task marker and identifying the task associated with the selected marker. The system then retrieves detailed information about the selected task from the task and resources databases or from the local cache.

The system determines available actions for the selected task marker (Operation 225). One or more actions may be associated with an individual task. Example actions include scheduling resources, rescheduling resources, unscheduling resources, and canceling a task. Scheduling resources may include assigning one or more resources to a task, generating a work order, setting a start and/or end time, reserving tools and materials, estimating travel time/cost, updating calendars, and updating a status to "scheduled." Rescheduling resources may include modifying a start and/or end time, reassigning one or more resources, and updating calendars. Unscheduling resources may include canceling a work order, canceling tools and materials, updating calendars, and updating the status to "unscheduled." Canceling a task may include unscheduling resources, canceling the work order, canceling tools and materials, updating calendars, and updating a status to "inactive" and/or "closed." One or more embodiments determine the available actions for the tasks based on the current status corresponding to the individual tasks. The available actions corresponding to a status may be stored in a lookup table or similar that maps statuses to available actions. For example, the actions available for unscheduled tasks may include schedule and cancel. Additionally, the actions available for scheduled tasks may include reschedule, unschedule, and cancel.

Figure 3B:
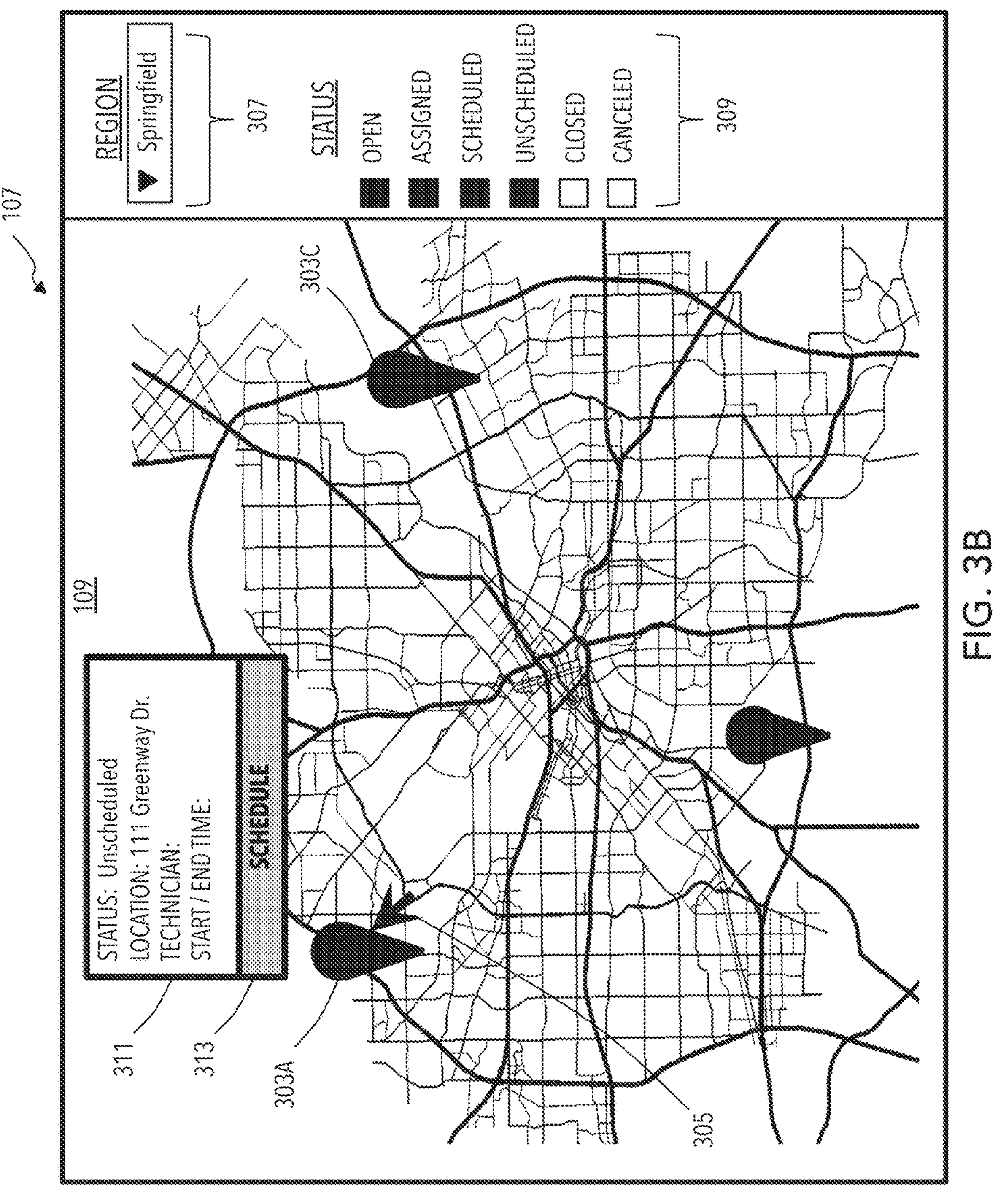

The system presents a selectable GUI element in the user interface corresponding to the location of the selected task marker including the available actions corresponding to the task (Operation 227). Presenting the selectable GUI element includes updating the map display by generating the selectable GUI element in the map display. The GUI element may be a tooltip, pop-up menu, contextual menu, or the like displayed over or near the selected test marker in the map. The GUI element includes the task and resource metadata along with one or more available actions that can be performed for the task. Additionally, the GUI element includes an interactive selection that allows the user to choose the available actions determined for the service task. For example, as illustrated in FIG. 3B, in response to the selection of task marker 303A using the pointer 305, the GUI 107 displays an interactive tooltip 311 in the map 109 proximate to the location of the task marker 303A. The tooltip 311 displays metadata of the task, including the status being "open" and the task's location being "1111 Greenway Dr." However, as the task is not currently assigned a resource or a start/end time, these fields of the tooltip 311 are empty. Additionally, based on the current status of the task corresponding to task marker 303A, the tooltip 311 displays the interactive selection "Schedule" to trigger scheduling of the task.

The system detects the selection of an interactive selection for one of the available actions in the GUI element (Operation 229). The user may make a selection by clicking on one of the interactive selections within the GUI element using a pointer. The system then processes the selection by triggering the corresponding functions or commands associated with the action without leaving the map display. For example, as illustrated in FIG. 3B, the selection of the interactive element 313 ("Schedule") using the pointer 305 triggers the system to schedule the task corresponding to task marker 303A.

While presenting the map display, the system calls an API that performs the selected action associated with the task (Operation 231). In one or more embodiments, performing the selected action includes sending a request to the back-end server that processes the request. The request includes parameters that specify the geographic region and the task metadata, including the details of the task and the resource requirements involved in performing the task. Upon receiving the API request, the server processes the request by querying the database for task-related information and geographic data. For example, in response to detecting the selection of the selectable element 313 for scheduling the task corresponding to task marker 303A in FIG. 3B, the system may generate a request to schedule the task through an HTTP POST request including the task metadata and resource requirements of the task.

Figure 3C:
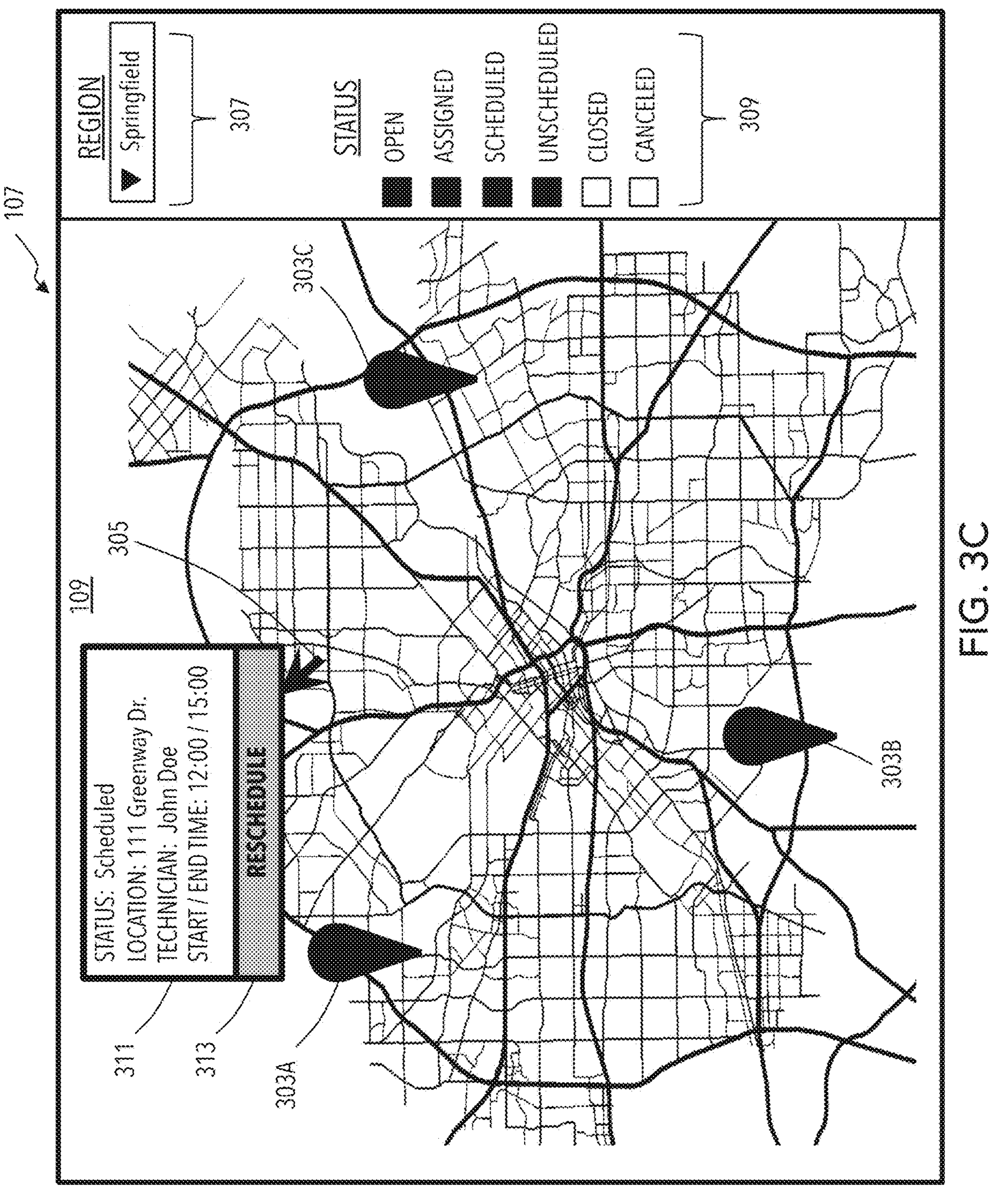
Figure 3D:
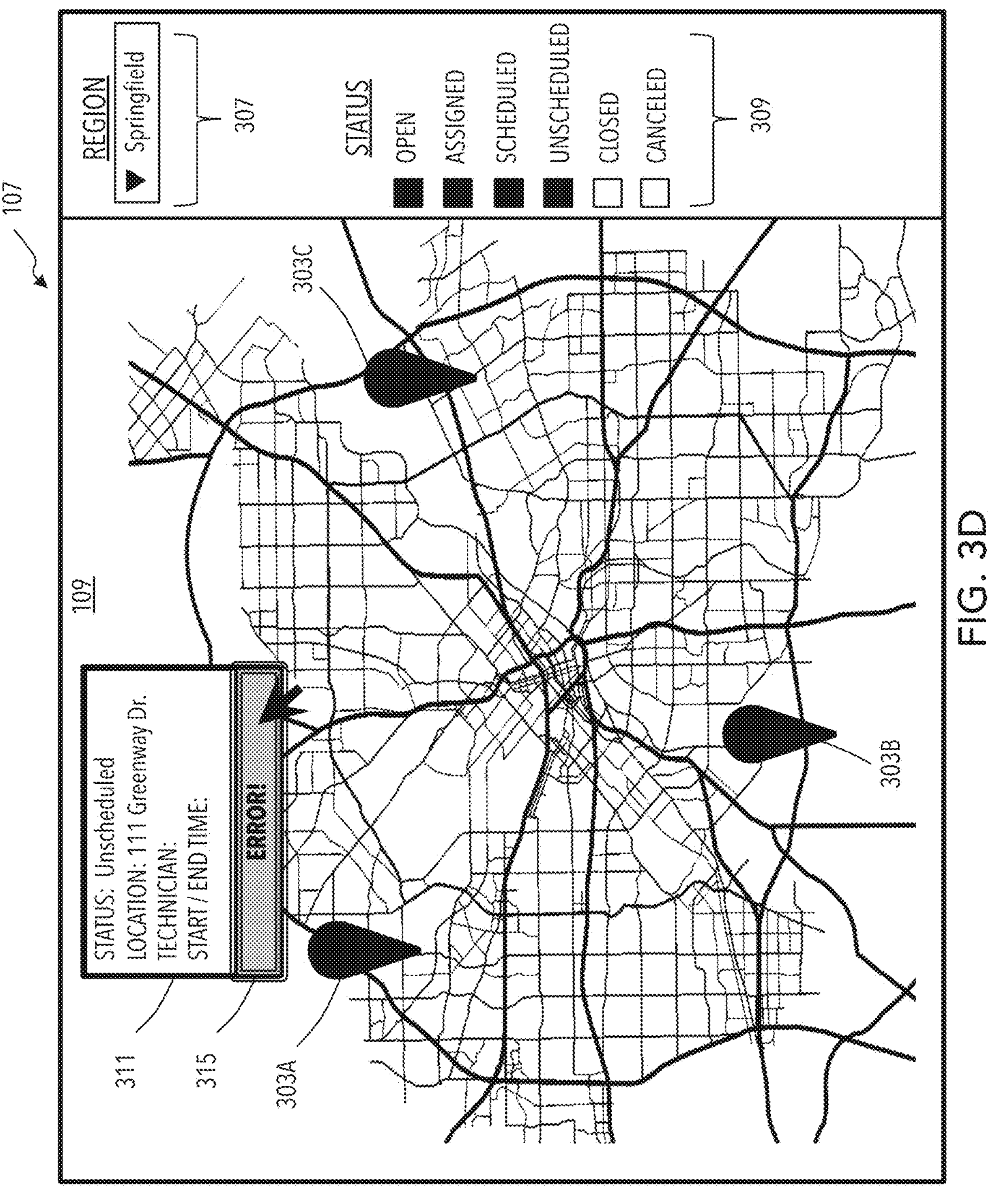

While presenting the map view including the map, the system presents a notification indicating the status of the task (Operation 233). After performing the selected action, the API generates a response that includes the map data and task details. Based on the response from the API, the system updates the GUI, including the interactive element. For example, as illustrated by the map 109 in FIG. 3C, the tooltip 311 is updated with resource and scheduling information returned by the API. Additionally, based on the updated status of the task corresponding to the task marker 303A, the tooltip 311 displays the selectable element 313 indicating an updated available action "Reschedule." Alternatively, in instances where the API is unsuccessful in performing the selected action, the GUI element is updated with an error notification. For example, as illustrated in FIG. 3D, the interactive selection 313 displays "Error!" for selection by the user to allow the user to resolve whatever issue prevented scheduling.

6. Example of Field Service Management Using a Map View

A detailed example is described below for purposes of clarity. Components and/or operations described below should be understood as one specific example which may not be applicable to certain embodiments. Accordingly, components and/or operations described below should not be construed as limiting the scope of any of the claims.

In the present example, a user controls a service management system to manage the assignment of resources to tasks. In the context of the example, the user is a dispatcher, the service management system is an FSM, the resources are technicians, and the tasks are repair requests. As illustrated in FIG. 3A, the FSM may generate a GUI 107 displaying a map 109 of a region 301, including task markers 303A, 303B, and 303C, that indicate open repair requests. The task markers 303A, 303B, and 303C are positioned at locations on the map 109 registered with the geographical locations of the repair requests. This arrangement allows the dispatcher to view and identify where open repair request are situated within the geographic region displayed on the map 109.

The dispatcher may select the task marker 303A using a pointer 305 of the GUI 107. Responsive to the selection, the FSM retrieves information associated with the repair request corresponding to the selected task marker 303A. In some cases, the FSM calls an API that generates queries to retrieve task information, including task metadata and resource requirements, for the repair request and returns the results for display by the GUI 107. For instance, as illustrated in FIG. 3B, the FSM generates an interactive tooltip 311 in the map 109, including the information retrieved for the corresponding repair request, including a status of the task, location of the task, assigned resources, and start and end times.

In addition to the task details, the tooltip 311 displays a selectable element 313 indicating an available action for the repair request based on the current status of the request. In the present example, based on the current status of the request being "Unscheduled," the system may use a lookup table to determine that the available action is scheduling the repair request. Accordingly, the selectable element 313 of the tooltip 311 indicates the selection "Schedule" triggers scheduling of the repair request directly within the map 109.

In response to detecting the selection of the selectable element 313, the FSM system performs a process to schedule the repair request. The process may include identifying an appropriate technician, start time, and end time for performing the repair request using information stored in a task database and/or a resource database. One or more embodiments perform the process concurrently with the ongoing display of the map 109 in the GUI 107. Performing the process may include initiating an API call comprising the task metadata to generate a scheduling request for a scheduling model. The scheduling model uses predictive analytics and machine learning to schedule a particular technician based on requirements specific to the repair request, such as the technician's availability, skill set, and tools, along with the repair request's priority and geographic location. Using the output of the scheduling model, the API may update a schedule in a task database. Additionally, the API returns the scheduling information to the GUI 107 for display by the tooltip 311.

In some instances, the scheduling information includes an indication of the success of the scheduling process and details of the scheduled repair. In some other instances, the scheduling information includes an indication of the failure of the scheduling process. In instances where the scheduling request succeeded, such as illustrated in FIG. 3C, the system updates the tooltip 311 with the current status type (e.g., "Scheduled") and the received scheduling information. Additionally, based on the current status type, the system determines and displays an updated selectable element 313 in the tooltip 311 indicating selectable actions currently available for the scheduled request. For example, the selectable element 313 may be updated to display the available action, "Unschedule." In instances where the scheduling request failed, such as illustrated in FIG. 3D, the selectable element 313 in the tooltip 311 may display a status of the request such as "Error." Selecting the "Error" selection may trigger the system to display information that indicates the cause of the error, such as "No Resources Available" or the like.

By handling the task scheduling and confirmation solely within the map 109, the system provides an efficient computer-user interface that avoids repeatedly updating task and resource information in response to a user navigating between multiple dashboards. Furthermore, by performing task management and scheduling within the map display 109, the system simplifies the user experience using a reduced set of information.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
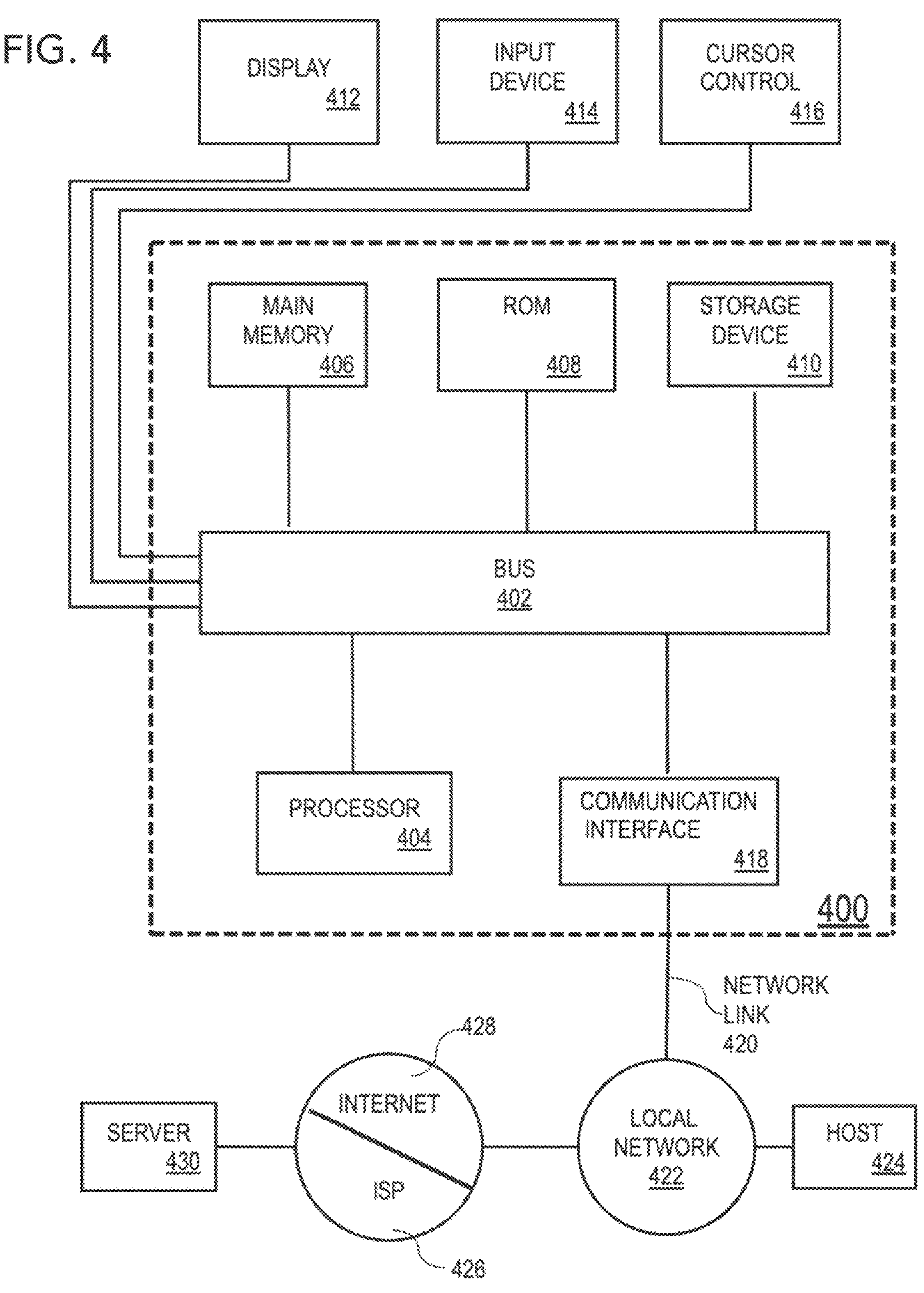
FIG. 4 illustrates a block diagram of an example computer system in accordance with one or more embodiments.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or a Solid State Drive (SSD) is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions that, when executed by one or more hardware processors, cause performance of operations comprising:

determining, based on metadata that describes a task and a status of the task:

a geographic location of the task, and one or more available actions of a plurality of actions associated with the status of the task;

presenting, in a graphical user interface (GUI) displayed by a user device, an interactive map comprising a representation of a geographic region and a marker that represents the geographic location of the task in the geographic region;

receiving, via the GUI displayed by the user device, first user input that selects the marker that represents the geographic location of the task;

responsive to receiving the first user input, concurrently presenting in the GUI displayed by the user device:

the interactive map comprising the representation of the geographic region, the marker that represents the geographic location of the task, and one or more selectable elements representing, respectively, the one or more available actions of the plurality of actions associated with the task;

receiving, via the GUI displayed by the user device, a second user input that selects a first selectable element representing a first available action of the one or more available actions associated with the task; and calling an application programming interface (API) that performs the first available action;

updating, based on performing the first available action, the metadata that describes the task and the status of the task to generate updated metadata of the task and an updated status of the task;

determining, based on the updated status of the task, one or more updated available actions of the plurality of actions associated with the task; and concurrently presenting, in the GUI displayed by a user device:

the interactive map comprising the representation of the geographic region, the marker that represents the geographic location of the task, and one or more updated selectable elements representing, respectively, the one or more updated available actions of the plurality of actions associated with the task.

2. The one or more non-transitory computer readable media of claim 1, wherein selecting the marker and selecting the action occur solely in the map presented by the GUI.

3. The one or more non-transitory computer readable media of claim 1, wherein the operations further comprise:

prefetching metadata associated with a plurality of tasks prior to presenting corresponding markers on the map; and presenting the selectable element corresponding to the available action, responsive to receiving the first user input, is based at least in part on the prefetched metadata.

4. The one or more non-transitory computer readable media of claim 1, wherein the operations further comprise: filtering content of the map based on filtering criteria.

5. The one or more non-transitory computer readable media of claim 1, wherein the available action comprises one or more of:

scheduling the task associated with the geographic location;

rescheduling the task associated with the geographic location;

unscheduling the task associated with the geographic location; or canceling the task associated with the geographic location.

6. The one or more non-transitory computer readable media of claim 5, wherein the scheduling is based on one or more predetermined scheduling rules.

7. The one or more non-transitory computer readable media of claim 5, wherein the scheduling comprises assigning the task to a human resource based on one or more predetermined scheduling rules.

8. The one or more non-transitory computer readable media of claim 1, wherein the operations further comprise:

receiving a response from the API; and based on the response, presenting a message in the GUI concurrent with presenting the map.

9. The one or more non-transitory computer readable media of claim 8, wherein the response indicates that the available action cannot be completed, and the message comprises an error message.

10. A method comprising:

determining, based on metadata that describes a task and a status of the task:

a geographic location of the task, and one or more available actions of a plurality of actions associated with the status of the task;

presenting, in a graphical user interface (GUI) displayed by a user device, an interactive map comprising a representation of a geographic region and a marker that represents the geographic location of the task in the geographic region;

receiving, via the GUI displayed by the user device, first user input that selects the marker that represents the geographic location of the task;

responsive to receiving the first user input, concurrently presenting in the GUI displayed by the user device:

the interactive map comprising the representation of the geographic region, the marker that represents the geographic location of the task, and one or more selectable elements representing, respectively, the one or more available actions of the plurality of actions associated with the task;

receiving, via the GUI displayed by the user device, a second user input that selects a first selectable element representing a first available action of the one or more available actions associated with the task; and calling an application programming interface (API) that performs the first available action;

updating, based on performing the first available action, the metadata that describes the task and the status of the task to generate updated metadata of the task and an updated status of the task;

determining, based on the updated status of the task, one or more updated available actions of the plurality of actions associated with the task; and concurrently presenting, in the GUI displayed by a user device:

the interactive map comprising the representation of the geographic region, the marker that represents the geographic location of the task, and one or more updated selectable elements representing, respectively, the one or more updated available actions of the plurality of actions associated with the task.

11. The method of claim 10, wherein selecting the marker and selecting the action occur solely in the map presented by the GUI.

12. The method of claim 10, further comprising:

prefetching metadata associated with a plurality of tasks prior to presenting corresponding markers on the map; and presenting the selectable element corresponding to the available action, responsive to receiving the first user input, is based at least in part on the prefetched metadata.

13. The method of claim 10, further comprising:

filtering content of the map based on filtering criteria.

14. The method of claim 10, wherein the available action comprises one or more of:

scheduling the task associated with the geographic location;

rescheduling the task associated with the geographic location;

unscheduling the task associated with the geographic location; or canceling the task associated with the geographic location.

15. The method of claim 14, wherein the scheduling is based on one or more predetermined scheduling rules.

16. The method of claim 14, wherein the scheduling comprises assigning the task to a human resource based on one or more predetermined scheduling rules.

17. The method of claim 10, further comprising:

receiving a response from the API; and based on the response, presenting a message in the GUI concurrent with presenting the map.

18. The method of claim 17, wherein the response indicates that the available action cannot be completed, and the message comprises an error message.

19. A system comprising:

at least one device including a hardware processor;

the system being configured to perform operations comprising:

determining, based on metadata that describes a task and a status of the task:

a geographic location of the task, and one or more available actions of a plurality of actions associated with the status of the task;

presenting, in a graphical user interface (GUI) displayed by a user device, an interactive map comprising a representation of a geographic region and a marker that represents the geographic location of the task in the geographic region;

receiving, via the GUI displayed by the user device, first user input that selects the marker that represents the geographic location of the task;

responsive to receiving the first user input, concurrently presenting in the GUI displayed by the user device:

the interactive map comprising the representation of the geographic region, the marker that represents the geographic location of the task, and one or more selectable elements representing, respectively, the one or more available actions of the plurality of actions associated with the task;

receiving, via the GUI displayed by the user device, a second user input that selects a first selectable element representing a first available action of the one or more available actions associated with the task; and calling an application programming interface (API) that performs the first available action;

updating, based on performing the first available action, the metadata that describes the task and the status of the task to generate updated metadata of the task and an updated status of the task;

determining, based on the updated status of the task, one or more updated available actions of the plurality of actions associated with the task; and concurrently presenting, in the GUI displayed by a user device:

the interactive map comprising the representation of the geographic region, the marker that represents the geographic location of the task, and one or more updated selectable elements representing, respectively, the one or more updated available actions of the plurality of actions associated with the task.

20. The system of claim 19, wherein:

selecting the marker and selecting the action occur solely in the map presented by the GUI; and the operations further comprise:

receiving a response from the API; and based on the response, presenting a message in the GUI concurrent with presenting the map.

* * * * *